United States Patent
Vanmechelen

(10) Patent No.: US 9,403,614 B2
(45) Date of Patent: Aug. 2, 2016

(54) METHOD FOR PRODUCING A RE-CLOSABLE-CONTAINER

(71) Applicant: NEVEN-LEMMENS PLASTICS, Wellen (BE)

(72) Inventor: Laurent Vanmechelen, Zutendaal (BE)

(73) Assignee: NEVEN-LEMMENS PLASTICS, Wellen (BE)

( * ) Notice: Subject to any disclaimer, the term of this patent is extended or adjusted under 35 U.S.C. 154(b) by 211 days.

(21) Appl. No.: 14/136,451

(22) Filed: Dec. 20, 2013

(65) Prior Publication Data

US 2014/0373330 A1     Dec. 25, 2014

(30) Foreign Application Priority Data

Jun. 20, 2013 (BE) .................................. 13173098.8

(51) Int. Cl.
*B29C 43/02* (2006.01)
*B65D 1/26* (2006.01)
(Continued)

(52) U.S. Cl.
CPC ............... *B65D 1/26* (2013.01); *B29C 51/306* (2013.01); *B65D 43/162* (2013.01); *B29C 51/325* (2013.01); *B29C 65/08* (2013.01); *B29C 65/18* (2013.01); *B29C 65/7441* (2013.01); *B29C 66/112* (2013.01); *B29C 66/131* (2013.01); *B29C 66/232* (2013.01); *B29C 66/344* (2013.01); *B29C 66/53461* (2013.01); *B29C 66/549* (2013.01); *B29C 66/71* (2013.01); *B29C 66/81463* (2013.01); *B29L 2031/22* (2013.01);
(Continued)

(58) Field of Classification Search
CPC ............... B65D 1/26; B65D 43/162; B65D 2251/1091; B29C 51/306; B29C 51/325; B29C 65/7441; B29C 65/08; B29C 65/18; B29C 66/549; B29C 66/232; B29C 66/71; B29C 66/344; B29C 66/81463; Y10T 29/49826; B29L 2031/22; B29L 2031/7162; B29K 2023/06; B29K 2023/12; B29K 2067/003

See application file for complete search history.

(56) References Cited

U.S. PATENT DOCUMENTS

| 4,079,567 A * | 3/1978 | Spruyt ................ B29C 45/0055 264/248 |
| 2007/0194495 A1 * | 8/2007 | Henderson .............. B29C 43/02 264/319 |

FOREIGN PATENT DOCUMENTS

| DE | 10 2008 034 493 A1 | 1/2010 |
| JP | 2001-328666 A | 11/2001 |

(Continued)

OTHER PUBLICATIONS

European Search Report of 13 17 3098 dated Oct. 22, 2013.

*Primary Examiner* — David Bryant
*Assistant Examiner* — Jun Yoo
(74) *Attorney, Agent, or Firm* — Sughrue Mion, PLLC

(57) ABSTRACT

A method for producing a re-closable container. The method includes sealing a lidding film (10) on the upper surface (6) of the peripheral flange (5) and on the upper surface (11) of the peripheral frame member (9). During the sealing step, the bridging elements (13) of the discontinuous die-cut line (12) are broken by displacing the peripheral frame member (9) by means of the seal tool to a lower level than the peripheral flange (5). When opening the container, the lidding film (10) is peeled off from the container body (1) but stays adhered to the peripheral frame member (9) of the lid (2). The container can easily be opened since the bridging elements (13) between the lid (2) and the container body (1) are broken during the heat sealing step.

18 Claims, 4 Drawing Sheets

| | | | |
|---|---|---|---|
| (51) | Int. Cl. | | |
| | *B65D 43/16* | (2006.01) | |
| | *B29C 51/30* | (2006.01) | |
| | *B29L 31/22* | (2006.01) | |
| | *B29L 31/00* | (2006.01) | |
| | *B29C 65/08* | (2006.01) | |
| | *B29C 65/18* | (2006.01) | |
| | *B29C 65/74* | (2006.01) | |
| | *B29C 65/00* | (2006.01) | |
| | *B29C 51/32* | (2006.01) | |

(52) U.S. Cl.
CPC . *B29L2031/7162* (2013.01); *B65D 2251/1091* (2013.01); *Y10T 29/49826* (2015.01)

(56) References Cited

FOREIGN PATENT DOCUMENTS

| | | |
|---|---|---|
| WO | 2005/039997 A1 | 5/2005 |
| WO | 2012/087114 A1 | 6/2012 |

\* cited by examiner

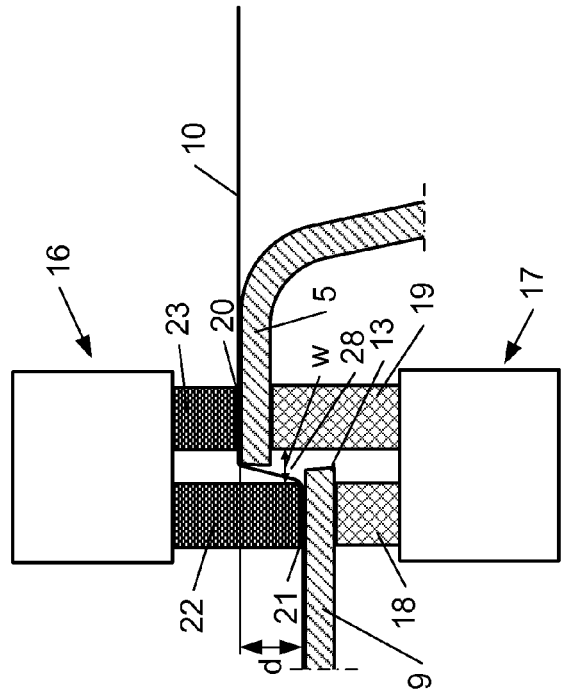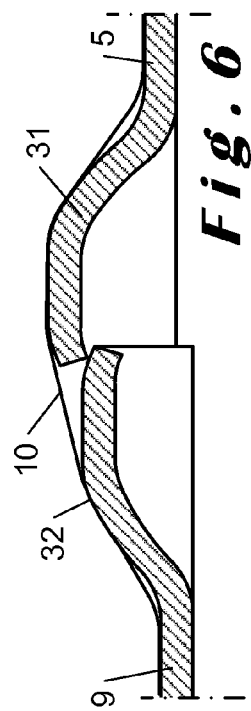
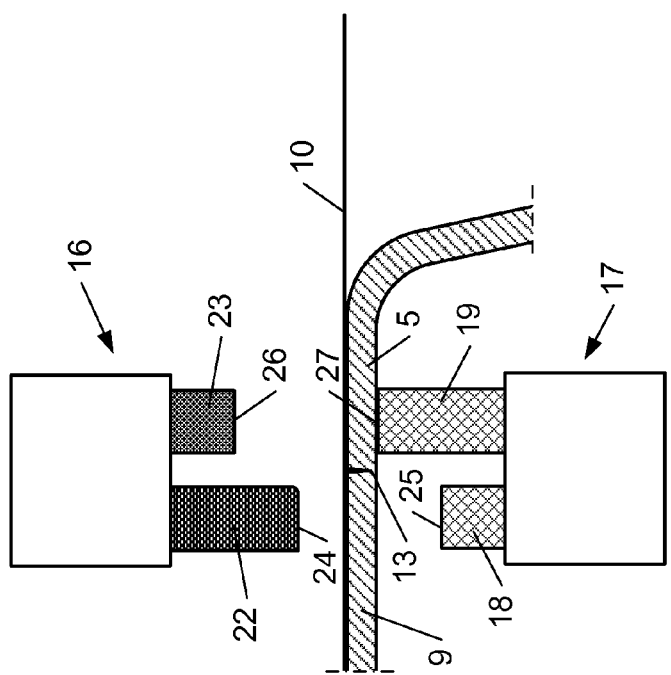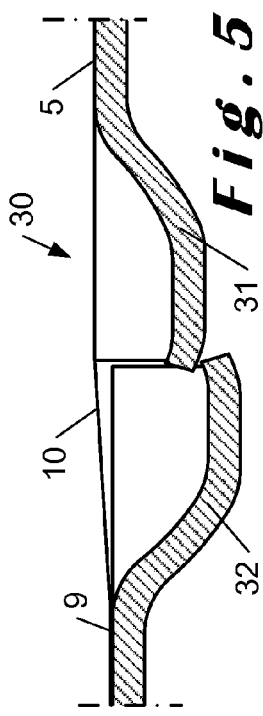

METHOD FOR PRODUCING A RE-CLOSABLE-CONTAINER

The present invention relates to a method for producing a re-closable container. This container comprises a container body having a bottom wall and a circumferential side wall extending upwardly from the bottom wall and terminating in an outwardly directed peripheral flange having an upper surface defining an access opening into an interior compartment of the container body, and a closure lid having a peripheral frame member which surrounds at least partially the peripheral flange of the container body and a lidding film which is adhered to said peripheral frame member on an upper surface thereof. The container body and the peripheral frame member are produced in one piece and are separated from one another by a discontinuous die-cut line. This die-cut line contains bridging elements attaching the peripheral frame member of the closure lid to the peripheral flange of the container body so that next to said die-cut line the upper surface of the peripheral frame member is substantially at a same level as the upper surface of the peripheral flange. At least next to said die-cut line the peripheral flange of the container body and the peripheral frame member of the lid are less flexible than the lidding film. To produce this re-closable container from the container body and the lidding film, this lidding film is sealed, in a sealing step, by means of a seal tool, on the one hand, according to a first seal line around said access opening onto the upper surface of the peripheral flange to seal off the interior compartment of the container body and, on the other hand, according to a second seal line, along said discontinuous die-cut line, onto the peripheral frame member to adhere the lidding film to the peripheral frame member. The seal tool comprises an upper seal tool, having a first and a second seal blade, and a lower seal tool, having a first and a second support blade. During the sealing step, the peripheral frame member with the lidding film applied on its upper surface is pressed between a press surface of the first seal blade and a press surface of the first support blade whilst the peripheral flange with the lidding film applied on its upper surface is pressed between a press surface of the second seal blade and a press surface of the second support blade.

A re-closable container which comprises a lidding film which is sealed on a peripheral flange of the container body and on a peripheral frame member of the lid is disclosed for example in DE 10 2008 034 493 and in JP 2001-328666. The container body is with the peripheral frame member attached thereto is thermoformed in one piece from a thermoplastic foil. Due to the fact that the upper surface of the peripheral flange of the container body is at a same level as the upper surface of the peripheral frame member of the lid, this peripheral frame member can easily be separated by a die-cutting process from the peripheral flange of the container body. After this die-cutting process, the peripheral frame member of the lid remains fixed by means of bridging elements to the peripheral flange of the container body until the re-closable container is opened. In this state, the lidding film can easily be sealed onto the upper surface of the peripheral flange and on the upper surface of the peripheral frame member as both upper surfaces are on a same level. When opening the container, the user has to peel off the lidding film from the peripheral flange and has at the same time to break the bridging elements. Since these bridging elements are made of the same material as the container body, it requires quite a lot of force to break them by pulling on the lid. Moreover, since the container is filled with a product, such as for example a food product, there is a great risk of spilling that product when tearing the lid open.

To solve this problem WO 2012/087114 discloses to mould the peripheral frame member of the lid with its upper surface at a higher level than the upper surface of the peripheral flange of the lid and to maintain only a thin film of the plastic material between the peripheral frame member and the peripheral flange. This is achieved by producing the container body with an injection moulding process. When sealing the lidding film onto the upper surfaces of the peripheral frame member and the peripheral flange, the peripheral flange member is pushed down until its upper surface is at the same level as the upper surface of the peripheral flange. Due to the rigid nature of the plastic material of the container body, the thin film breaks during this movement and the bridging elements between the peripheral frame member and the peripheral flange are thus broken. When the peripheral frame member has been pushed downwards so that the upper surfaces of the peripheral frame member and the peripheral flange are at a same level, the lidding film is sealed onto these upper surfaces. The seal tool used for this sealing process comprises an upper seal tool, having a first and a second heated seal blade, and a lower seal tool, having a first and a second support blade. The press surfaces of the heated seal blades are at a same level and the press surfaces of the support blades are also at a same level so that the lidding film is sealed onto the upper surfaces of the peripheral frame member and the peripheral flange when these are at a same level. After the sealing operation, the lidding film keeps the peripheral frame member and the peripheral flange in this mutual position.

A drawback of the method disclosed in WO 2012/087114 is that the container body and the peripheral frame member of the lid cannot be produced by a thermoforming process but have to be injection moulded in order to be able to mould them on a different level with a thin plastic injection moulded film as breakable connection.

An object of the present invention is now to provide a new method for producing a re-closable container which enables to break the bridging elements between a container body and peripheral frame member, the upper surfaces of which are at a same level so that the bridging elements can be formed by a discontinuous die-cut line between the peripheral flange of the container body and the peripheral frame member so that the container does not need to be injection moulded to provide the weakened bridging elements between the peripheral flange of the container body and the peripheral frame member of the lid.

To this end, the method according to the present invention is characterised in that during the sealing step the peripheral frame member is displaced relative to the peripheral flange by means of the seal tool so that next to said die-cut line the upper surface of the peripheral frame member is moved to a level which is lower than the level of the upper surface of the peripheral flange next to said die-cut line whereby a shearing action is exerted onto said bridging elements so as to cut these bridging elements without cutting the lidding film, the lidding film being sealed to the upper surfaces of the peripheral frame member and the peripheral flange with the upper surface of the peripheral frame member being at said lower level with respect to the level of the upper surface of the peripheral flange.

In WO 2012/087114 the lidding film is first applied onto the peripheral frame member after which this peripheral frame member is pushed downward, together with the lidding film applied thereon, until the lidding film is pressed not only against the upper surface of the peripheral frame member of the lid but also against the upper surface of the peripheral flange of the container body. During this movement the lidding film remains flat and has not to be deformed. The lidding film is heat sealed in a flat position onto the coplanar upper surfaces of the peripheral frame member and the peripheral flange. In the method of the present invention, however, the upper surface of the peripheral frame member is moved to a lower level than the upper surface of the peripheral flange. During this movement, the peripheral frame member has to be separated from the peripheral flange by the shearing action exerted onto the bridging elements. The present inventors have found that, due to the higher flexibility of the lidding film, it is possible to cut the bridging elements by this movement, without cutting the lidding film, notwithstanding the fact that the lidding film is also deformed by the shearing action exerted thereon. Since before the sealing step the upper surfaces of the peripheral frame member and the peripheral flange may thus be situated on a same level, and may in particular be co-planar, the peripheral frame member of the lid can easily be separated from the peripheral edge of the container body by a die-cutting process so that they do not have to be produced by an injection moulding process to be able to provide thin bridging elements connecting them. Since such an injection moulding process is generally more expensive than a thermoforming process, the container body and the peripheral frame member are preferably thermoformed in one piece from a thermoplastic foil. This thermoplastic foil is less flexible than the lidding film.

In an advantageous embodiment of the method of the present invention, the peripheral frame member is displaced by means of the seal tool relative to the peripheral flange during said sealing step so that next to said die-cut line the upper surface of the peripheral frame member is moved to a level which is at least 0.8 mm, preferably at least 1.0 mm, more preferably at least 1.2 mm and most preferably at least 1.4 mm lower than the level of the upper surface of the peripheral flange next to said die-cut line. Preferably, the peripheral frame member is displaced relative to the peripheral flange by means of the seal tool so that next to said die-cut line the upper surface of the peripheral frame member is moved to a level which is less than 5.0 mm, preferably less than 4.0 mm, more preferably less than 3.0 mm and most preferably less than 2.0 mm lower than the level of the upper surface of the peripheral flange next to said die-cut line.

Such relative displacements were found to be especially suitable to cut the bridging elements without cutting or tearing the lidding film.

In another advantageous embodiment, the sealing step is a heat sealing step wherein the lidding film is heat sealed onto the upper surface of the peripheral flange and onto the upper surface of the peripheral frame member by means of said first seal blade and said second seal blade which is are both heated.

In a further advantageous embodiment of the method of the present invention the lidding film extends in a gap between the first seal blade and the second support blade when the peripheral flange and the peripheral frame member are pressed between the press surfaces of the seal tool, which gap has preferably a width of at least 0.2 mm, more preferably of at least 0.4 mm and most preferably of at least 0.6 mm. Preferably, this gap has a width of less than 4.0 mm, preferably less than 3.0 mm, more preferably less than 2.0 mm and most preferably less than 1.5 mm.

Such gap widths were found to be especially suitable to cut the bridging elements without cutting or tearing the lidding film.

The lidding film is moreover preferably stretched is between the first and the second seal blades, i.e. between the first and the second seal lines, and is plastically deformed thereby. As a result thereof the lidding film becomes dome-shaped at the transition between the peripheral frame member and the peripheral flange which facilitates latching the peripheral frame member underneath the peripheral flange when re-closing the lid of the container.

In another aspect, the present invention relates to a method for producing a container which is suitable for use in a method according to the first aspect of the invention and which comprises a container body having a bottom wall and a circumferential side wall extending upwardly from the bottom wall and terminating in an outwardly directed peripheral flange having an upper surface defining an access opening into an interior compartment of the container body, and a peripheral frame member which surrounds at least partially the peripheral flange of the container body and which has an upper surface intended to be heat sealed to a lidding film to form a closure lid. In this method the container body and the peripheral frame member are produced in one piece and are separated from one another by die-cutting along a discontinuous die-cut line containing bridging elements attaching the peripheral frame member of the closure lid to the peripheral flange of the container body so that next to said die-cut line the upper surface of the peripheral frame member is substantially at a same level as the upper surface of the peripheral flange. The method according to this aspect of the invention is characterised in that when producing the container body and the peripheral frame member, one or more bulges are formed in the peripheral flange and in the peripheral frame member, which bulges are divided by said die-cut line in two parts, a first part being located on the peripheral flange and a second part on the peripheral frame member, and are compressed when die-cutting said die-cut line and/or when sealing a lidding film onto the upper surface of the peripheral flange and onto the upper surface of the peripheral frame member.

Preferably, the access opening to the interior compartment of the container body is generally rectangular so that said peripheral flange has four corner sections, two adjacent corner sections comprising each one of said bulges.

Due to the fact that the bulges are compressed when die-cutting the die-cut line between the peripheral frame member of the lid and the peripheral frame of the container body and/or when sealing the lidding film onto the container body, the bulges are plastically deformed to some extent so that the parts of the bottom walls of the bulges that are located on the peripheral flange extend somewhat further towards the peripheral frame member and/or so that the parts of the bottom walls of the bulges that are located on the peripheral frame member extend somewhat further towards the peripheral flange. In this way, these bottom wall parts form latching tabs enabling to latch the peripheral frame member underneath the peripheral flange when re-closing the container.

In a preferred embodiment of the method according to this other aspect of the invention, at least one of said bulges extends downwards to form a notch in the upper surfaces of the peripheral flange and the peripheral frame member, at least the first part of said downwardly extending bulge being compressed when sealing the lidding film onto the upper surface of the peripheral flange and onto the upper surface of the peripheral frame member.

In this way, the first part of the downwardly extending bulge does not only extends more outwardly towards the peripheral frame member to achieve a more effective locking but it is moreover compressed, whilst the second part of the bulge is not or less compressed, so that when re-closing the lid this second part snaps more easily automatically underneath the first part of the bulge.

In a preferred embodiment of the method according to this other aspect of the invention, at least one of said bulges extends upwards to protrude from the upper surfaces of the peripheral flange and the peripheral frame member, at least the second part of said upwardly extending bulge being compressed when sealing the lidding film onto the upper surface of the peripheral flange and onto the upper surface of the peripheral frame member.

In this way, the second part of the upwardly extending bulge does not only extends more inwardly towards the peripheral flange of the container body to achieve a more effective locking but it is moreover compressed, whilst the first part of the bulge is not or less compressed, so that when re-closing the lid this second part snaps more easily automatically underneath the first part of the bulge.

Other particularities and advantages of the invention will become apparent from the following description of some particular embodiments of the method according to the present invention. The reference numerals used in this description relate to the annexed drawings wherein:

FIGS. 4a and 4b are cross-sectional views through a seal tool, with an upper and a lower seal tool, illustrating two steps of the heat sealing process applied to seal the lidding film to the peripheral flange of the container body and to the peripheral frame member of the lid;

Figure 1:
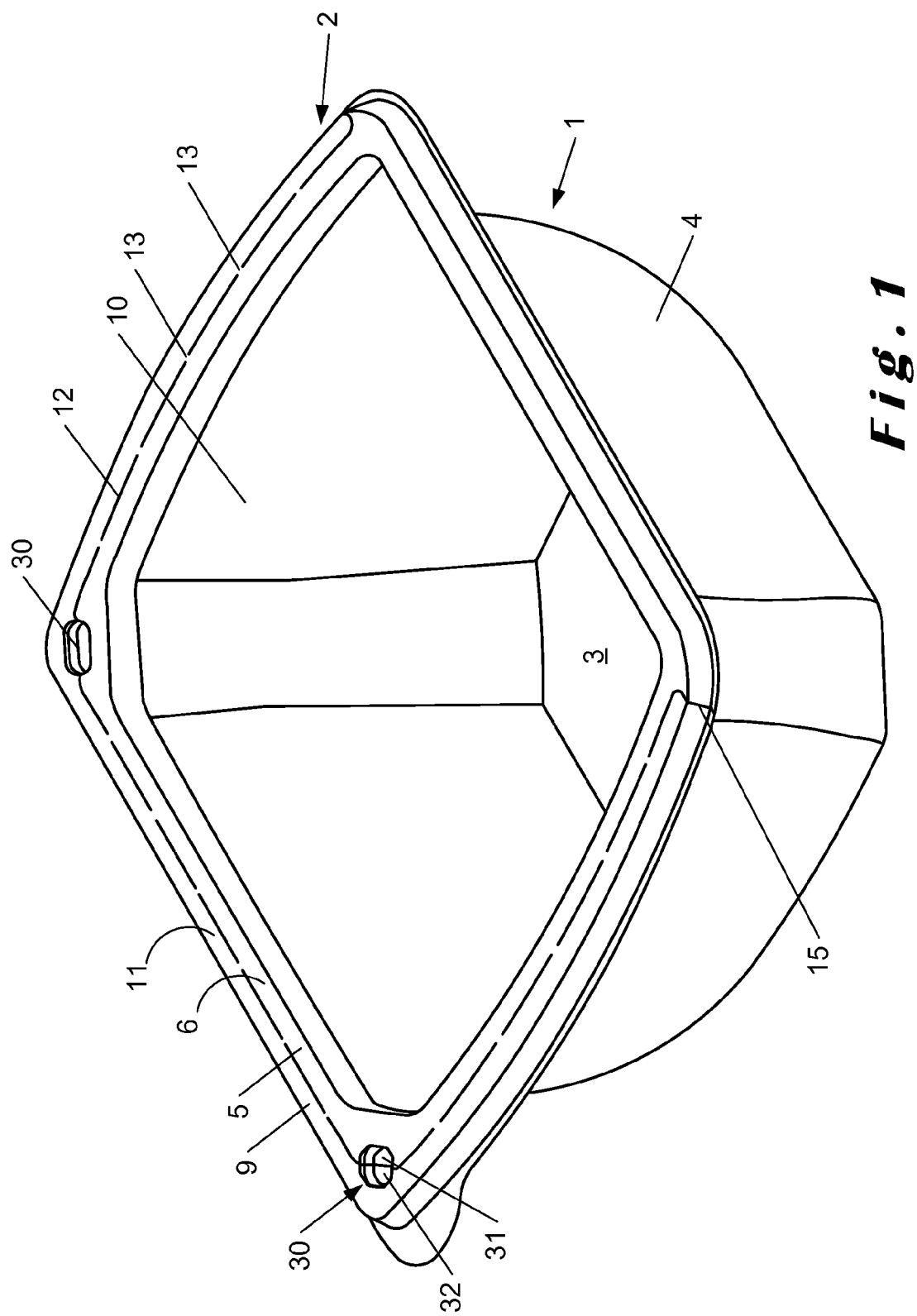
FIG. 1 is a perspective view on a re-closable container according to a particular embodiment of the invention.

FIG. 5 shows, on a larger scale, a cross-sectional view through one of the downwardly extending bulges formed in the peripheral flange of the container body and the peripheral frame member of the lid, wherein after having opened the container the lid is closed again and the peripheral frame member is latched at the locations of the bulges underneath the peripheral flange; and FIG. 6 is a same view as FIG. 5 but showing an upwardly projecting bulge.

The present invention relates in a first aspect to a method for producing a re-closable container, more particularly to the last step of such a production process wherein, after having filled the container with a product or an article, it is closed off by means of a lidding film. An example of such a container is illustrated, in its closed position, in FIG. 1 and, in its opened position, in FIG. 2.

The container illustrated in these figures comprises a container body 1, which may be in the form of a tray, and a closure lid 2. The container body 1 has a bottom wall 3 and a circumferential side wall 4 which extends upwardly from the bottom wall 3 and terminates in an outwardly directed peripheral flange 5. This flange 5 has an upper surface 6 defining an access opening 7 into an interior compartment 8 of the container body 1. The closure lid 2 has a peripheral frame member 9 which surrounds at least partially the peripheral flange 5 of the container body 1 and a lidding film 10 which is adhered to the peripheral frame member 9 on an upper surface 11 thereof.

The container body 1 and the peripheral frame member 9 of the lid 2 by be injection moulded but are preferably thermoformed in one piece from a thermoplastic foil. This foil is made of a plastic material such as polyethylene (PE), polypropylene (PP) or polyethylene terephthalate (PET). The peripheral frame member 9 is separated from the peripheral flange 5 of the container body 1 by a die-cutting process. A discontinuous die-cut line 12 is thereby formed which comprises bridging elements 13 attaching the peripheral frame member 9 to the peripheral flange 5. Next to this die-cut line 12, the upper surface 11 of the peripheral frame member 9 is substantially at a same level as the upper surface 6 of the peripheral flange 5, i.e. at substantially the same height above the bottom wall 3 of the container body 1, or in other words above a flat surface onto which the container is placed. By "upper surface" is meant in the present specification the top surface of an element that is substantially horizontal when the container is placed onto a horizontal flat surface or that forms at the most an angle of 50°, in particular of at the most 40° and more particularly of at the most 30° with a horizontal plane. In this way the discontinuous die-cut line 12 with the bridging elements 13 are easy to produce by die-cutting.

At some locations, the separation between the peripheral frame member 9 and the peripheral flange 5 can for example also be made by another cutting technique, such as by laser cutting. For example when the die-cut line 12, and thus also the peripheral frame member 9, doesn't surround the peripheral flange 5 completely, but ends at the location of a hinge area 14 in the lidding film 10. At this hinge area 14, the two longitudinal ends of the peripheral frame member 9 can be cut off completely from the peripheral flange 5 by a transverse cut 15 which can be made by die-cutting or by laser cutting.

Figure 2:
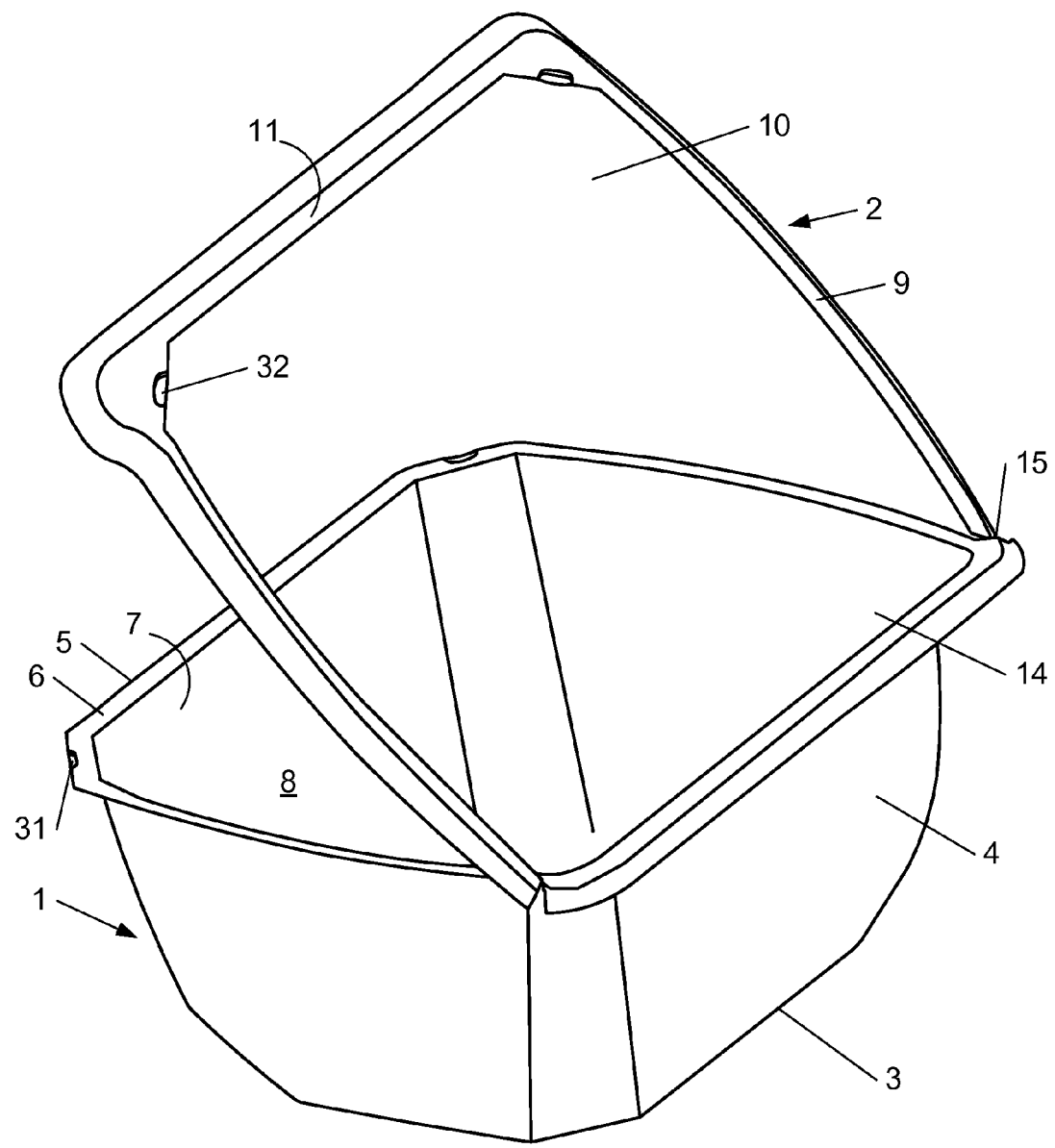
FIG. 2 is a same view as FIG. 1 with the lid of the re-closable container in its open position.

The present invention relates in particular to the way the lidding film 10 is sealed, by a seal process, onto the container body 1 and onto the peripheral frame member 9 attached thereto by the bridging elements 13. This seal process can be carried out by high frequency or ultrasonic welding but is preferable carried out by a combination of heat and pressure, i.e. by a heat seal process which is, as illustrated schematically in the cross-sectional views of FIGS. 4a and 4b, carried out by means of a seal tool which comprises an upper seal tool 16 and a lower seal tool 17. An example of a lower seal tool 17, which is suited for sealing the container illustrated in FIGS. 1 and 2, is shown in FIG. 3.

Figure 3:
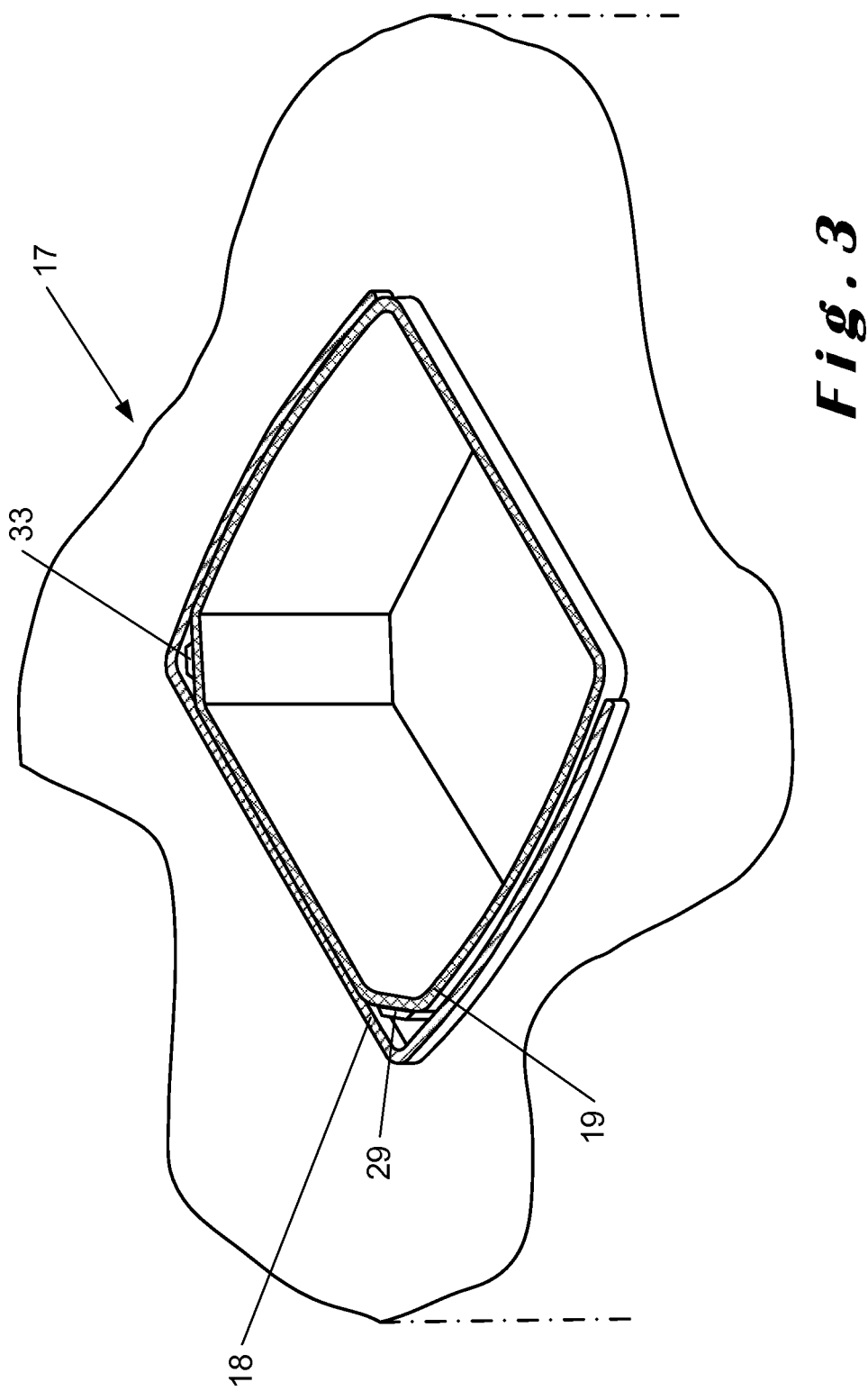
FIG. 3 is a perspective view on a lower seal tool suited for heat sealing the lidding film of the re-closable container illustrated in the previous figures to the peripheral flange of the container body and to the peripheral frame member of the lid.

The lower seal tool 17, illustrated in FIG. 3, comprises a first (outer) support blade 18 which partially surrounds a second (inner) support blade 19. When the container body 1 is positioned onto this lower seal tool 17, its peripheral flange 5 is supported by the second support blade 19 whilst the first support blade 18 is located underneath the peripheral frame member 9 (see also FIG. 4a). The lidding film 10, which is positioned in a flat state on top of the container body 1, is heat sealed, on the one hand, according to a first, continuous seal line 20 around the access opening 7 of the container body 1 onto the upper surface 6 of the peripheral flange 5 of the container body 1 to seal off the interior compartment 8 of this container body 1 and, on the other hand, according to a second seal line 21, along said discontinuous die-cut line 12, onto the upper surface 11 of the peripheral frame member 9 to adhere the lidding film 10 to the peripheral frame member 9 to form the closure lid 2. The first seal line 20, which is preferably a continuous seal line to achieve a hermetic sealing of the interior compartment 8 of the container, is applied entirely around the access opening 7 and follows the second, inner support blade 19 illustrated in FIG. 3. The second seal line 21, which need not be continuous for the hermetic sealing of the interior compartment 8 of the container, is achieved by the first, inner seal line 20, and does not extend entirely around the access opening 7 but only follows the first, outer support blade 18.

As can be seen in FIGS. 4a and 4b, the upper seal tool 16 comprises a first (outer) heated seal blade 22, which is situated opposite the first support blade 18, and a second (inner) heated seal blade 23, which is situated opposite the second support blade 19. In a first phase of the heat sealing step, the container body 1 with the peripheral frame member 9 attached thereto is supported with its peripheral flange 5 onto the second support blade 19 and the lidding film 10 is applied in a flat state on top of the container body 1. The lidding film 10 is preferably tensioned somewhat to keep it in a flat state. In a second phase, the upper seal tool 16 is lowered onto the lower seal tool 17 to reach the position illustrated in FIG. 4b. In this position the peripheral frame member 9 with the lidding film 10 applied on its upper surface 11 is pressed between a press surface 24 of the first heated seal blade 22 and a press surface 25 of the first support blade 18 whilst the peripheral flange 5 with the lidding film 10 applied on its upper surface 6 is pressed between a press surface 26 of the second heated seal blade 23 and a press surface 27 of the second support blade 19.

As can be seen in FIGS. 4a and 4b, when sealing the lidding film 10 onto the peripheral flange 5 of the container body 1 and the peripheral frame member 9 of the closure lid 2, the bridging elements 13 of the discontinuous die-cut line 12 between the peripheral flange 5 and the peripheral frame member 9 are cut so that after having sealed the lidding film 10 onto the container body 1, the peripheral frame member 9 of the lid 2 is only connected by means of this lidding film 10 to the container body 1. This cutting is achieved by displacing the peripheral frame member 9 during the heat sealing step relative to the peripheral flange 5 of the container body 1 so that next to the die-cut line 12 separating the peripheral frame member 9 and the peripheral flange 5 the upper surface 11 of the peripheral frame member 9 is moved to a level which is lower than the level of the upper surface 6 of the peripheral flange 5 next to this die-cut line 12. In this way, a shearing action is exerted onto the bridging elements 13 whereby these bridging elements 13 are cut. During this cutting process the lidding film 10 is not cut. This is due to the fact that the lidding film 10 is more flexible than the thermoplastic foil, the container body 1 and the peripheral frame member 9 of the lid 2 are made of, i.e. the lidding film 10 is more flexible than the peripheral frame member 9 and the peripheral flange 5 next to the die-cut line 12, or in other words the thermoplastic foil is less flexible than the lidding film 10.

The distance d over which the upper surface 11 of the peripheral frame member 9 is lowered next to the die-cut line 12 with respect to the upper surface 6 of the peripheral flange 5 comprises preferably at least 0.8 mm, more preferably at least 1.0 mm, most preferably at least 1.2 mm and even more preferably at least 1.4 mm. The distance d is preferably smaller than 5.0 mm, more preferably smaller than 4.0 mm, most preferably smaller than 3.0 mm and even more preferably smaller than 2.0 mm.

When the peripheral flange 5 of the container body 1 and the peripheral frame member 9 of the lid 2 are pressed between the press surfaces 24, 25, 26, 27 of the seal tool, i.e. in the position illustrated in FIG. 4b, the lidding film 10 extends in a gap 28 between the first heated seal blade 22 and the second support blade 19, which gap 28 has preferably a width w of at least 0.2 mm, more preferably of at least 0.4 mm and most preferably of at least 0.6 mm. The width w of the gap 28 is preferably smaller than 4.0 mm, more preferably smaller than 3.0 mm, most preferably smaller than 2.0 mm and even more preferably less than 1.5 mm.

The greater the distance d and/or the smaller the width w, the greater the shearing/cutting effect and vice versa the smaller the distance d and/or the greater the width w, the smaller the shearing/cutting effect.

When cutting the bridging elements 13, a shearing effect is also exerted onto the lidding film 10. Due to its higher flexibility, this lidding film 10 is however not cut. Instead, it is plastically deformed, more particularly stretched. In this way, the lidding film 10 is no longer flat but extends upwards at the transition between the peripheral flange 5 and the peripheral frame member 9 so that when reclosing the container, after having opened it, the peripheral frame member 9 of the closure lid 2 can be brought more easily to a lower level than the peripheral flange 5 to latch the lid underneath the peripheral flange 5 of the container body 1. Stretching of the lidding film 10 in the gap 28 can be increased by reducing the width w and/or increasing the distance d and can be decreased by increasing the width w and/or reducing the distance d.

The flexibility of the lidding film 10 depends on the thickness of the film and of the material it is made of. Preferably it is made of polyethylene (PE) which is generally more flexible than for example polypropylene (of which the container body is preferably made). The lidding film 10 preferably has a thickness which is less than 50%, preferably less than 40%, more preferably less than 30% and most preferably less than 20% of the thickness of the peripheral flange 5 and the peripheral frame member 9 next to the die-cut line 12 so that even when it would be made of a same material, its flexibility is considerably larger than the flexibility of the peripheral flange 5 and the peripheral frame member 9. The flexibility of the lidding film 10 and of the thermoplastic foil from which the peripheral flange 5 and the peripheral frame member 9 is made can be determined by a bending test.

During the sealing step, the different seal and/or support blades may move in different orders. The first (outer) seal blade 22 may for example move first towards the first (outer) support blade 18 after which the second (inner) seal blade 23 moves towards to second (inner) support blade 19. This embodiment may be advantageous in case the lidding film 10 is to be sealed more strongly (longer welding period) onto the peripheral frame member 9 than onto the peripheral flange 5 from which has to be peeled off when opening the container. It has however been found that a complex control of the movements of the seal and support blades is not required to achieve the above described cutting and stretching effect but that both seal blades and/or both support blades may move together with one another. As in the embodiment illustrated in FIGS. 4a and 4b, the seal blades 22, 23 may thus be in a fixed position with respect to one another whilst the support blades 18, 19 may also be in a fixed position with respect to one another. In this way, only the upper seal tool 16 with the seal blades 22, 23 fixed thereto has to be moved with respect to the lower seal tool 17 comprising the support blades 18, 19 in a fixed position with respect to one another.

In a preferred embodiment of the method of the present invention, the first seal blade 22 is therefore in a fixed position with respect to the second seal blade 23, the press surface 24 of the first seal blade 22 being at a first level and the press surface 26 of the second seal blade 23 at a second level which is higher than the first level. The difference between the first and the second level, which is in the embodiment illustrated in FIGS. 4a and 4b equal to the distance d, is preferably larger than 0.8 mm, more preferably larger than 1.0 mm, most preferably larger than 1.2 mm and even more preferably larger than 1.4 mm, but smaller than 5.0 mm, preferably smaller than 4.0 mm, more preferably smaller than 3.0 mm and most preferably smaller than 2.0 mm.

Also the first support blade 18 is preferably in a fixed position with respect to the second support blade 19, the press surface 25 of the first support blade 18 being at a third level and the press surface 27 of the second support blade 19 at a fourth level which is higher than the third level. The difference between the third and the second level, which is in the embodiment illustrated in FIGS. 4a and 4b also equal to the distance d, is preferably larger than 0.8 mm, more preferably larger than 1.0 mm, most preferably larger than 1.2 mm and even more preferably larger than 1.4 mm, but smaller than 5.0 mm, preferably smaller than 4.0 mm, more preferably smaller than 3.0 mm and most preferably smaller than 2.0 mm.

Preferably, the difference between said first and said second level is substantially equal to the difference between said third and fourth level.

A further aspect of the present invention relates to the method for producing a container which is suitable for being sealed with the lidding film 10 by the method described hereabove. The produced container comprises the container body 1 with the bottom wall 3 and the circumferential side wall 4 which extends upwardly from the bottom wall 3 and terminates in the outwardly directed peripheral flange 5. It also comprises the peripheral frame member 9 which surrounds at least partially the peripheral flange 5 of the container body 1. The upper surface 11 of the peripheral frame member 9 is intended to be sealed to the lidding film 10 to form a closure lid 2. In this method the container body 1 and the peripheral frame member 9 are produced in one piece and are separated from one another by die-cutting to produce the discontinuous die-cut line 12 containing the bridging elements 13 that attach the peripheral frame member 9 of the closure lid 2 to the peripheral flange 5 of the container body 1 so that next to the die-cut line 12 the upper surface 11 of the peripheral frame member 9 is substantially at a same level as the upper surface 6 of the peripheral flange 5.

When producing the container body 1 with the peripheral frame member 9 attached thereto, one or more downwardly or upwardly extending bulges 30 are formed in the peripheral flange 5 and in the peripheral frame member 9. Each of the bulges 30 extends partially on the peripheral flange 5 of the container body 1 and partially on the peripheral frame member 9. Preferably, the access opening 7 to the interior compartment 8 of the container body 1 is generally rectangular so that the peripheral flange 5 has four corner sections, two adjacent corner sections comprising preferably each one of said bulges 30.

When die-cutting the die-cut line 12 that divides the bulges 30 in two parts, the bulges 30 are preferably compressed by means of the die-cut tool. As a result thereof, the bulges 30 are plastically deformed so that the parts 31 of the bulges 30 that are located on the peripheral flange 5 extend somewhat further towards the peripheral frame member 9 whilst the parts 32 of the bulges 30 that are located on the peripheral frame member 9 extend somewhat further towards the peripheral flange 5. In this way, these parts 31, 32 form mutually co-operating latching tabs enabling to latch the peripheral frame member 9 underneath the peripheral flange 5 when re-closing the container. These latching tabs are illustrated in their latched position in FIG. 5 for a downwardly extending bulge 30 and in FIG. 6 for an upwardly extending bulge 30.

As appears from FIG. 3, when sealing the lidding film 10 on top of the peripheral flange 5 of the container body 1 and the peripheral frame member 9 of the closure lid 2, the downwardly extending bulges 30 in the corner sections of the container project downwards between the first 18 and the second support blades 19 of the lower seal tool 17 so that the bulges 30 will be located between the first 20 and the second seal lines 21. Due to the fact that in the embodiment illustrated in the drawings the two bulges 30 are located in the corners of the container body 1, a minimum of interior compartment volume is lost. Moreover, the parts 31, 32 of each of the bulges 30 latch effectively underneath one another. On the opposite side, the hinge of the container is only formed by the hinge area 14 of the flexible lidding film 10 so that when opening the container, it stays open as illustrated in FIG. 2. Reclosing of the container is quite easy since, due to the fact that the lidding film 10 has been deformed along the die-cut line 12 to extend upwards at that location (to form a dome-shape), one simply has to push somewhat onto the peripheral frame member 9 to latch the bottom parts 31, 32 of the bulges 30 underneath one another. When the lidding film 10 has not been deformed in accordance with the first aspect of the present invention, but has been sealed onto the upper surfaces 6, 11 of the peripheral flange 5 and the peripheral frame member 9 while maintaining these upper surfaces 6, 11 on a same level (i.e. without breaking the bridging elements 13), the bottom parts 31, 32 of the bulges 30 also act as latching tabs but a somewhat larger local force is needed to snap the outer bottom parts 32 of the bulges 30 underneath the inner bottom parts 31 thereof.

In a variant embodiment, it is possible to omit the hinge area and to provide four bulges 30, i.e. one on each corner, so that the lid 2 can be removed entirely and be repositioned onto the container body 1 with the bottom parts 31, 32 of the bulges 30 snapping or latching underneath one another to keep the container closed.

In addition or alternatively to being compressed during the die-cutting step, the bulges 30 can also be compressed in the seal tool during the sealing step. When the bulge 30 extends downwards, the first part 31 of the bulge 30, i.e. the inner part, is preferably compressed, more particularly by the press element 29 provided at the location of this first part 31 between the two support blades 18, 19 (see FIG. 3). In this way, as can be seen in FIG. 5, this inner part 31 extends further outwards so that a more effective latching is achieved. Moreover, the inner part 31 is at a somewhat higher level than the outer part of the bulge 30 so that the outer part 32 of the bulge 30 can be latched even more easily underneath the inner part 31 of the bulge 30 when reclosing the container.

When the bulge 30 extends upwardly, the outer part 32 thereof is preferably compressed during the sealing step (see FIG. 6). In this way, this outer part 32 extends further inwards so that again a more effective latching is achieved. Moreover, the outer part 32 is at a somewhat lower level than the inner part 31 of the bulge 30 so that this outer part 32 can again be latched even more easily underneath the inner part 31 of the bulge 30 when reclosing the container. This means that only a light pressure has to be exerted onto the lid to latch its peripheral frame member 9 at the location of the bulges 30 underneath the peripheral flange 5 of the container body 1.

The invention claimed is:

1. A method for producing a re-closable container, which container comprises:
    a container body (1) having a bottom wall (3) and a circumferential side wall (4) extending upwardly from the bottom wall (3) and terminating in an outwardly directed peripheral flange (5) having an upper surface (6) defining an access opening (7) into an interior compartment (8) of the container body (1), and
    a closure lid (2) having a peripheral frame member (9) which surrounds at least partially the peripheral flange (5) of the container body (1) and a lidding film (10) which is adhered to said peripheral frame member (9) on an upper surface (11) thereof,
    the container body (1) and the peripheral frame member (9) are produced in one piece and are separated from one another by a discontinuous die-cut line (12) containing bridging elements (13) attaching the peripheral frame member (9) of the closure lid (2) to the peripheral flange (5) of the container body (1) so that next to said die-cut line (12) the upper surface (11) of the peripheral frame member (9) is substantially at a same level as the upper surface (6) of the peripheral flange (5), the peripheral flange (5) of the container body (1) and the peripheral frame member (9) of the lid (2) being next to said die-cut line (12) less flexible than said lidding film (10), which method comprises the following steps:

sealing the lidding film (10) by means of a seal tool (16, 17), on the one hand, according to a first seal line (20) around said access opening (7) onto the upper surface (6) of the peripheral flange (5) to seal off the interior compartment (8) of the container body (1) and, on the other hand, according to a second seal line (21), along said discontinuous die-cut line (12), onto the upper surface (11) of the peripheral frame member (9) to adhere the lidding film (10) to the peripheral frame member (9), which seal tool comprises an upper seal tool (16), having a first (22) and a second seal blade (23), and a lower seal tool (17), having a first (18) and a second support blade (19), the peripheral frame member (9) with the lidding film (10) applied on its upper surface (11) being pressed during the sealing step between a press surface (24) of the first seal blade (22) and a press surface (25) of the first support blade (18) and the peripheral flange (5) with the lidding film (10) applied on its upper surface (6) between a press surface (26) of the second seal blade (23) and a press surface (27) of the second support blade (19), and displacing the peripheral frame member (9) during said sealing step relative to the peripheral flange (5) by means of the seal tool (16, 17) so that next to said die-cut line (12) the upper surface (11) of the peripheral frame member (9) is moved to a level which is lower than the level of the upper surface (6) of the peripheral flange (5) next to said die-cut line (12) whereby a shearing action is exerted onto said bridging elements (13) so as to cut these bridging elements (13) without cutting the lidding film (10), the lidding film (10) being sealed to the upper surfaces (6, 11) of the peripheral frame member (9) and the peripheral flange (5) with the upper surface (11) of the peripheral frame member (9) being at said lower level with respect to the level of the upper surface (6) of the peripheral flange (5).

2. A method according to claim 1, characterised in that the container body (1) and the peripheral frame member (9) are thermoformed in one piece from a thermoplastic foil.

3. A method according to claim 1, characterised in that said sealing step is a heat sealing step wherein the lidding film (10) is heat sealed onto the upper surface (6) of the peripheral flange (5) and onto the upper surface (11) of the peripheral frame member (9) by means of said first seal blade (22) and said second seal blade (23) which is are both heated.

4. A method according to claim 1, characterised in that during said sealing step the peripheral frame member (9) is displaced relative to the peripheral flange (5) by means of the seal tool (16, 17) so that next to said die-cut line (12) the upper surface (11) of the peripheral frame member (9) is moved to a level which is at least 0.8 mm, preferably at least 1.0 mm, more preferably at least 1.2 mm and most preferably at least 1.4 mm lower than the level of the upper surface (6) of the peripheral flange (5) next to said die-cut line (12).

5. A method according to claim 1, characterised in that during said sealing step the peripheral frame member (9) is displaced relative to the peripheral flange (5) by means of the seal tool (16, 17) so that next to said die-cut line (12) the upper surface (11) of the peripheral frame member (9) is moved to a level which is less than 5.0 mm, preferably less than 4.0 mm, more preferably less than 3.0 mm and most preferably less than 2.0 mm lower than the level of the upper surface (6) of the peripheral flange (5) next to said die-cut line (12).

6. A method according to claim 1, characterised in that when the peripheral flange (5) and the peripheral frame member (9) are pressed between the press surfaces (24-27) of the seal tool (16, 17), the lidding film (10) extends in a gap (28) between the first seal blade (22) and the second support blade (19), which gap (28) has preferably a width (w) of at least 0.2 mm, more preferably of at least 0.4 mm and most preferably of at least 0.6 mm.

7. A method according to claim 6, characterised in that said gap (28) has a width (w) of less than 4.0 mm, preferably less than 3.0 mm, more preferably less than 2.0 mm and most preferably less than 1.5 mm.

8. A method according to claim 1, characterised in that during said sealing step the lidding film (10) is stretched between the first (22) and the second seal blades (23) and is thereby plastically deformed.

9. A method according to claim 1, characterised in that during the sealing step the first seal blade (22) is moved together with the second seal blade (23) and/or the first support blade (18) is moved together with the second support blade (19).

10. A method according to claim 9, characterised in that the first seal blade (22) is in a fixed position with respect to the second seal blade (23), the press surface (24) of the first seal blade (22) being at a first level and the press surface (26) of the second seal blade (23) at a second level which is higher than the first level, the difference (d) between the first and the second level being larger than 0.8 mm, preferably larger than 1.0 mm, more preferably larger than 1.2 mm and most preferably larger than 1.4 mm, but smaller than 5.0 mm, preferably smaller than 4.0 mm, more preferably smaller than 3.0 mm and most preferably smaller than 2.0 mm.

11. A method according to claim 9, characterised in that the first support blade (18) is in a fixed position with respect to the second support blade (19), the press surface (25) of the first support blade (18) being at a third level and the press surface (27) of the second support blade (19) at a fourth level which is higher than the third level, the difference (d) between the third and the second level being larger than 0.8 mm, preferably larger than 1.0 mm, more preferably larger than 1.2 mm and most preferably larger than 1.4 mm, but smaller than 5.0 mm, preferably smaller than 4.0 mm, more preferably smaller than 3.0 mm and most preferably smaller than 2.0 mm.

12. A method according to claim 10, characterised in that the difference (d) between said first and said second level is substantially equal to the difference between said third and fourth level.

13. A method according to claim 1, characterised in that when producing the container body (1) and the peripheral frame member (9) attached thereto, one or more bulges (30) are formed in the peripheral flange (5) and in the peripheral frame member (9), which bulges (30) are divided by said die-cut line (12) in two parts (31, 32), a first part (31) being located on the peripheral flange (5) and a second part (32) on the peripheral frame member (9), and are compressed when die-cutting said die-cut line (12) and/or during said sealing step.

14. A method according to claim 13, characterised in that said bulges (30) are formed to be located between said first (20) and second seal lines (21).

15. A method according to claim 13, characterised in that the access opening (7) to the interior compartment (8) of the container body (1) is generally rectangular so that said peripheral flange (5) has four corner sections, two adjacent corner sections comprising each one of said bulges (30).

16. A method for producing a thermoformed container which comprises:

a container body (1) having a bottom wall (3) and a circumferential side wall (4) extending upwardly from the bottom wall (3) and terminating in an outwardly directed peripheral flange (5) having an upper surface (6) defining an access opening (7) into an interior compartment (8) of the container body (1), and a peripheral frame member (9) which surrounds at least partially the peripheral flange (5) of the container body (1) and which has an upper surface (11) intended to be sealed to a lidding film (10) to form a closure lid (2), which method comprises the following steps:

producing the container body (1) and the peripheral frame member (9) in one piece;

separating the container body (1) from the peripheral frame member by die-cutting along a die-cut line (12);

forming one or more bulges (30) in the peripheral flange (5) and in the peripheral frame member (9) during said production step;

dividing said bulges (30) during said separation step by said die-cut line (12) in two parts (31, 32), a first part (31) being located on the peripheral flange (5) and a second part (32) on the peripheral frame member (9); and compressing said bulges (30).

17. A method according to claim 16, characterised in that at least one of said bulges (30) extends downwards to form a notch in the upper surfaces (6, 11) of the peripheral flange (5) and the peripheral frame member (9), at least the first part (31) of said downwardly extending bulge (30) being compressed when sealing the lidding film (12) onto the upper surface (6) of the peripheral flange (5) and onto the upper surface (11) of the peripheral frame member (9).

18. A method according to claim 16, characterised in that at least one of said bulges (30) extends upwards to protrude from the upper surfaces (6, 11) of the peripheral flange (5) and the peripheral frame member (9), at least the second part (31) of said upwardly extending bulge (30) being compressed when sealing the lidding film (12) onto the upper surface (6) of the peripheral flange (5) and onto the upper surface (11) of the peripheral frame member (9).

* * * * *